US012658066B2

(12) United States Patent
Naik et al.

(10) Patent No.: US 12,658,066 B2
(45) Date of Patent: Jun. 16, 2026

(54) CONTENT KNOWLEDGE QUERY GENERATION THROUGH COMPUTER ANALYSIS

(71) Applicant: International Business Machines Corporation, Armonk, NY (US)

(72) Inventors: Krishnakanth M Naik, Bangalore (IN); Nitin Gupta, Saharanpur (IN); Prerna Agarwal, New Delhi (IN); Manjit Singh Sodhi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 564 days.

(21) Appl. No.: 17/663,622

(22) Filed: May 16, 2022

(65) Prior Publication Data

US 2023/0368693 A1     Nov. 16, 2023

(51) Int. Cl.
*G09B 7/04*          (2006.01)
*G09B 5/06*          (2006.01)

(52) U.S. Cl.
CPC ................. *G09B 7/04* (2013.01); *G09B 5/06* (2013.01)

(58) Field of Classification Search
CPC .................................... G09B 7/04; G09B 5/06
USPC ......................................................... 434/322
See application file for complete search history.

(56) References Cited

U.S. PATENT DOCUMENTS

| 5,643,084 A | 7/1997 | Mirsky |
| 8,771,048 B2 | 7/2014 | Wayans |

| 9,449,216 B1 | 9/2016 | Dhua | |
| 10,143,913 B2 | 12/2018 | Baddoo | |
| 11,652,909 B1 | 5/2023 | Tang et al. | |
| 2004/0253569 A1* | 12/2004 | Deane .................... | G09B 17/00 434/4 |
| 2012/0263433 A1 | 10/2012 | Mei | |
| 2021/0121774 A1 | 4/2021 | Kasbar | |

(Continued)

FOREIGN PATENT DOCUMENTS

| CN | 111881172 A | * 11/2020 | ............. G06F 18/23 |
| KR | 20150028382 A | 3/2015 | |

OTHER PUBLICATIONS

Ahsan, et al., "Video Jigsaw: Unsupervised Learning of Spatiotemporal Context for Video Action Recognition", 2019 IEEE Winter Conference on Applications of Computer Vision, pp. 179-189, <https://ieeexplore.ieee.org/document/8659002>.

(Continued)

*Primary Examiner* — Xuan M Thai
*Assistant Examiner* — Zachary Joseph Pollock
(74) *Attorney, Agent, or Firm* — Joseph P. Curcuru

(57) ABSTRACT

In an approach to improve knowledge content query generation, embodiments identify one or more drift points based on implicit user feedback-based assessment and a user experience to generate one or more knowledge content queries of different complexity from a multi-media file. Further, embodiments adjust a threshold for the one or more drift points to generate different variations of the one or more knowledge content queries and perform iterative refinement on the one or more knowledge queries based on one or more previous iteration evaluations. Additionally, embodiments generate the one or more knowledge content queries in different modalities based on the multi-media file and the threshold for the one or more drift points.

20 Claims, 5 Drawing Sheets

(56) References Cited

U.S. PATENT DOCUMENTS

2022/0156298 A1* 5/2022 Mahmoud ........... G06F 16/9535

OTHER PUBLICATIONS

Feng, et al., "An Efficient Method for Automatic Video Annotation and Retrieval in Visual Sensor Networks", International Journal of Distributed Sensor Networks, vol. 2014, Article ID 832512, Mar. 31, 2014, 8 pages, <https://journals.sagepub.com/doi/full/10.1155/2014/832512>.

Kartal, et al., "Data-Driven Sokoban Puzzle Generation with Monte Carlo Tree Search", 12th AAAI Conference on Artificial Intelligence and Interactive Digital Entertainment, Oct. 2016, 7 pages, <http://motion.cs.umn.edu/pub/SokobanMCTS/DataDrivenSokobanMCTS.pdf>.

Khalifa, et al., "Automatic Puzzle Level Generation:, A General Approach using a Description Language", 2015 Computational Creativity and Games Workshop at ICCC, 8 pages, http://www.akhalifa.com/documents/AutomaticPuzzleLevelGeneration.pdf>.

Ortiz-Garcia, et al, "Automated generation and visualization of picture-logic puzzles", Computers & Graphics, vol. 31, 2007, pp. 750-760, <https://www.sciencedirect.com/science/article/abs/pii/S009784930700163X?via%3Dihub>.

Trivedi, et al., "Know-Evolve: Deep Temporal Reasoning for Dynamic Knowledge Graphs", arXiv:1705.05742v3, Jun. 21, 2017, 15 pages, <https://arxiv.org/pdf/1705.05742.pdf>.

Cesare et al., "A Piece of the (Ed)Puzzle: Using the Edpuzzle Interactive Video Platform to Facilitate Explicit Instruction", Journal of Special Education Technology 36.2, Feb. 2021, pp. 77-83.

Huang et al., "TEDQuiz: Automatic Quiz Generation for TED Talks Video Clips to Assess Listening Comprehension", 14Th international conference on advanced learning technologies. IEEE, 2014, 5 pages.

Rees, "Zendoku puzzle generation", Retrieved from: https://web.archive.org/web/20201225042455/https://garethrees.org/2007/06/10/zendoku-generation/, Jun. 10, 2007, 15 pages.

Shi et al., "A Framework for Automatically Generating IoT Security Quizzes in a Virtual 3D Environment Based on Linked Data", International Conference on Emerging Internetworking, Data & Web Technologies. Cham: Springer International Publishing, Feb. 2019, 11 pages.

Unknown, "Welcome to IBM Training", Retrieved from: https://web.archive.org/web/20210126181800/https://www.ibm.com/training/, Retrieved on: Jan. 26, 2021, 5 pages.

* cited by examiner

CONTENT KNOWLEDGE QUERY GENERATION THROUGH COMPUTER ANALYSIS

BACKGROUND OF THE INVENTION

The present invention relates generally to the field of educational tools, training devices and apparatus, and more particularly to the field of puzzle-based games for recreation, education, and/or business training.

A video lesson or lecture is a video which presents educational material for a topic which is to be learned, wherein the format of the video lesson or lecture may vary. The format may be a video of a teacher speaking to the camera, photographs and text about the topic or some mixture of these components. Several educational academies and institutions have been successful in teaching mathematics using notes written using internet services coupled with an educator voiceover. A study shows that there is hardly any difference in correctly answered questions when students were divided into two groups that used either live lecture or video lecture. Another meta-study investigated more than 100 studies and find out that about 75% of the time, students (i.e., individuals receiving the information) learned better from the video.

SUMMARY

Embodiments of the present invention disclose a computer-implemented method, a computer program product, and a system for generating a knowledge content query associated with a media file, the computer-implemented method comprising: identifying one or more drift points based on implicit user feedback-based assessment and a user experience to generate one or more knowledge content queries of different complexity from a multi-media file; adjusting a threshold for the one or more drift points to generate different variations of the one or more knowledge content queries; performing iterative refinement on the one or more knowledge queries based on one or more previous iteration evaluations; and generating the one or more knowledge content queries in different modalities based on the multi-media file and the threshold for the one or more drift points.

DETAILED DESCRIPTION

Figure 1A:
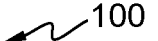
FIG. 1A is a functional block diagram illustrating a distributed data processing environment, in accordance with an embodiment of the present invention.
Figure 1A:
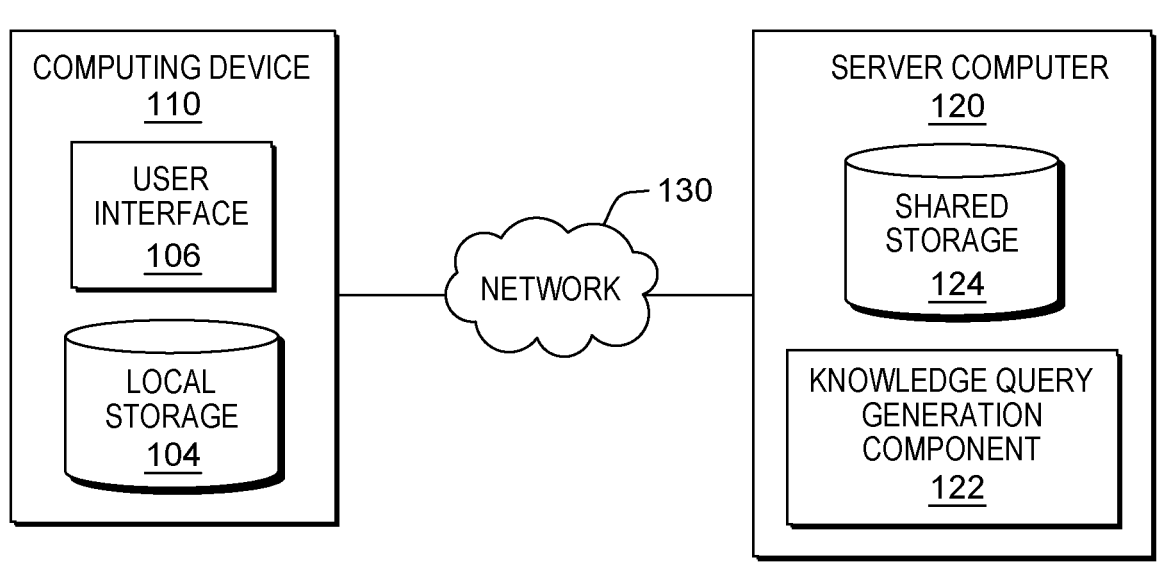

Embodiments of the present invention recognize that various learning events and/or quizzes are conducted to make the learning effective for the audience, and that building a new education validation test (e.g., puzzle/brainteaser) for every learning instance involves a lot of resources, effort, and time. Further, embodiments of the present invention recognize that the Internet is full of content in which people use to gain insight and knowledge. However, embodiments of the present invention recognize that, no work exists that aids in the automatic generation of educational content an education validation test (i.e., knowledge content query) to enhance the efficiency of user education. Embodiments of the present invention further recognize that puzzles may assist in various ways (e.g., (a) entertainment for both children and adults, (b) testing the knowledge of students, (c) security measures, (d) testing mental faculties, and (e) test the understanding of professionals).

A puzzle (i.e., knowledge query) here may be defined in three different ways: (i) secondary multi-media file, wherein the secondary multi-media file is generated from a primary multi-media file (e.g., generating sub video clips from a given video file that is associate with the user and/or information being taught to the user), (ii) text sequence, wherein text sequence comprises summarizing the generated secondary multi-media file in the textual format, so that the text sequence can be scrambled and presented to a user for unscrambling/re-arrange those based information presented in the primary multi-media file, and (iii) images, wherein image puzzles comprise generating one or more images by converting each secondary media-file into a single representative frame, wherein the generated images may be presented to a user in a scrambled/out of sync arrangement, wherein the user is queried to arrange the presented images in the sequence they are arranged in the primary multi-media file. Further, embodiments recognize that puzzles/knowledge queries can be organized in various ways. For instance, but not limited to, sequencing of puzzle pieces and filling the missing pieces in given sequence. Additionally, embodiments of the present invention recognize that the framework described above can be helpful to test the learning/understanding/concentration of students and/or professional at the time of the video lecture/training program. However, there is a need to improve efficiency in the generation of knowledge queries.

Embodiments of the present invention improve the art and solve at least the problems stated above by generating a knowledge query, also referred to as a knowledge content query herewith, out of one or more multi-media files based on analysed content with respect to various aspects of the one or more multi-media files (e.g., context from the audio, background, objects, object movement, and key characteristics and/or topics associated with the multi-media file) to validate knowledge objectives and assist in increasing learnability of materials in different levels of extraction, which can reduce the number of times a user revisits a multi-media file (e.g., learning material) and reduce educational and training costs. A knowledge objective may be a predetermined topic or portion of material that a user is required to at least acknowledge by meeting or exceeding a predetermined threshold. For example, in one embodiment, successfully answering at least 70% of the output knowledge query correctly.

Further, embodiments of the present invention improve the art and solve at least the problems stated above by (i) a learning data associated with a multi-media file (media file data) based on implicit user feedback-based assessments and/or user age and experience to generate knowledge queries of different complexity associated with the multimedia file, (ii) adjusting multi-media file data thresholds based on user feedback to generate different variations of knowledge queries, wherein the variations of knowledge queries comprise the type of knowledge query and level of difficulty, wherein low thresholds will give larger number of drift points will generate in a large number of knowledge query components (e.g., puzzles parts, and/or any other components of a knowledge query known in the art), and wherein, a higher threshold will generate smaller number of drift points (e.g., a smaller number of puzzle parts and/or any other components of a knowledge query known in the art), (iii) performing iterative refinement of the knowledge query based on previous iteration evaluation, which assists in reducing the time to re-visit a multi-media file to answer a generated knowledge query, and (iv) generating the knowledge query in one or more different modalities (e.g., text, video clips, Image, sequencing of detected puzzle pieces, filling the missing pieces in correct puzzle sequence, and/or any other modality known in the art). A video clip is at least a predetermined portion of a whole video.

Implementation of embodiments of the invention may take a variety of forms, and exemplary implementation details are discussed subsequently with reference to the Figures (i.e., FIG. 1A—FIG. 3).

FIG. 1A is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1A provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110 and server computer 120, and any other computing devices and/or storage devices (not shown in FIG. 1A) within distributed data processing environment 100.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer 120. In some embodiments computing device 110 may represent a plurality of computing devices.

In some embodiments of the present invention, computing device 110 may represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 may include an instance of user interface (interface) 106, and local storage 104. In various embodiments, not depicted in FIG. 1A, computing device 110 may have a plurality of interfaces 106. In other embodiments, not depicted in FIG. 1A, distributed data processing environment 100 may comprise a plurality of computing devices, plurality of server computers, and/or one a plurality of networks. Computing device 110 may include internal and external hardware components, as depicted, and described in further detail with respect to FIG. 3.

User interface (interface) 106 provides an interface to knowledge query generation component (component) 122. Computing device 110, via user interface 106, may enable a user and/or a client to interact with component 122 and/or server computer 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. interface 106 may include data (such as graphic, text, and sound) presented to a user and control sequences the user employs to control operations. In another embodiment, interface 106 may be a mobile application software providing an interface between a user of computing device 110 and server computer 120. Mobile application software, or an "app," may be designed to run on smart phones, tablet computers and other computing devices. In an embodiment, interface 106 may enable the user of computing device 110 to at least send data, input data, edit data (annotations), collect data and/or receive data.

Server computer 120 may be a standalone computing device, a management server, a web server, a mobile computing device, one or more client servers, or any other electronic device or computing system capable of receiving, sending, and processing data. In other embodiments, server computer 120 may represent a server computing system utilizing multiple computers such as, but not limited to, a server system, such as in a cloud computing environment. In another embodiment, server computer 120 may represent a computing system utilizing clustered computers and components (e.g., database server computers, application server computers, etc.) that act as a single pool of seamless resources when accessed within distributed data processing environment 100. Server computer 120 may include internal and external hardware components, as depicted, and described in further detail with respect to FIG. 3. In some embodiments server computer 120 may represent a plurality of server computers.

Each of shared storage 124 and local storage 104 may be a data/knowledge repository and/or a database that may be written and/or read by one or a combination of component 122, server computer 120 and computing device 110. In some embodiments, each of shared storage 124 and local storage 104 may be a data/knowledge repository, a knowledge base, a knowledge center, a knowledge corpus, and/or a database that may be written and/or read by one or a combination of component 122, server computer 120 and computing device 110. In the depicted embodiment, shared storage 124 resides on server computer 120 and local storage 104 resides on computing device 110. In another embodiment, shared storage 124 and/or local storage 104 may reside elsewhere within distributed data processing environment 100, provided that each may access and is accessible by computing device 110 and server computer 120. Shared storage 124 and/or local storage 104 may each be implemented with any type of storage device capable of storing data and configuration files that may be accessed and utilized by server computer 120, such as, but not limited to, a database server, a hard disk drive, or a flash memory. In various embodiments, not depicted in FIG. 1A, in addition to shared storage 124, server computer comprises a primary and a secondary database, described below in FIG. 3.

In the depicted embodiment, component 122 is executed on server computer 120. In other embodiments, component 122 may be executed on computing device 110. In various embodiments of the present invention, not depicted in FIG. 1A, component 122 may execute on a plurality of server computers 120 and/or on a plurality of computing devices 110. In some embodiments, component 122 may be located and/or executed anywhere within distributed data processing environment 100 as long as component 122 is connected to and/or communicates with, computing device 110, and/or server computer 120, via network 130. In various embodiments, not depicted in FIG. 1A, component 122 comprise various components (see FIG. 1B-1C).

In various embodiments, component 122 generates a knowledge query based on identified knowledge content from a multi-media file. Component 122 may analysis and monitor the content in the generated knowledge query and multi-media file to adjust the complexity of the knowledge query. Component 122 may analysis the semantics, key characteristics, background, characters, associated text, and other multi-media file data and characteristics known in the art to identify relevant knowledge content. In various embodiments, component 122 learns video drifts (i.e., drift points) based on different parameters such as, but not limited to, implicit user feedback-based Assessment, age, experience to generate queries (e.g., puzzles) of different complexities from a single video, wherein component 122 executes an iterative refinement of generated knowledge queries based on previous generated and/or received iteration evaluation. Video drifts, also referred to as drift points, represents a point of change in a multi-media file. For example, a video drift is, but not limited to, a change in or of a scene, a change in the video frame, change in objects in a video, and a change in the context of video content.

Component 122 improves the art and solve at least the problems stated above by (i) learning data associated with a multi-media file (media file data) based on implicit user feedback-based assessments and/or user age and experience to generate knowledge queries of different complexity associated with the multi-media file, (ii) adjusting multi-media file data thresholds based on user feedback to generate different variations of knowledge queries, wherein the variations of knowledge queries comprise the type/category of knowledge query and level of difficulty, wherein a predetermined low thresholds will output a larger number of drift points, based on a predetermined metric, and generate, based on a predetermined metric, a large number of knowledge query components (e.g., puzzles parts, and/or any other components of a knowledge query known in the art) in comparison to a predetermined higher threshold, and wherein, a predetermined higher threshold will generate, based on a predetermined metric, a smaller number of drift points in comparison to a predetermined lower threshold (e.g., a smaller number of puzzle parts and/or any other components of a knowledge query known in the art), (iii) performing iterative refinement of the knowledge query based on previous iteration evaluation, which assists in reducing the time to re-visit a multi-media file to answer a generated knowledge query, and (iv) generating the knowledge query in one or more different modalities (e.g., text, video clips, image, sequencing of detected puzzle pieces, filling the missing pieces in correct puzzle sequence, crosswords, word search, fill in the blank, and/or any other knowledge query modalities known in the art). Based at least on the actions detailed above, component 122 improves educational efficiency of a particular topic by reducing the number of times a user revisits a multi-media file (e.g., learning material) and by reducing educational and training costs. One example of the predetermined lower threshold includes a user requesting a less difficult/complex puzzle (e.g., fewer total number puzzle pieces), wherein, based on the received request, component 122 generates a large number of puzzle parts based on consideration and identification of small objects movements/change in a video to increase the amount of drift points. Conversely, if a user requests a more difficult puzzle, then component 122 would decrease the amount of identified drift points in a multi-media file.

Multi-media can be any visual representation with a combination of audio, video, animation, or graphics. Multi-media file may be any type of multi-media file known in the art. Multi-media file can be any computer file that plays audio and video, audio only, or video only. Some examples multi-media files comprise, but are not limited to, MPEG-1 Audio Layer III or MPEG-2 Audio Layer III (MP3) audio file, MPEG-4 Part 14 (MP4), audio video interleave (AVI), and window media video (WMV) files. Multi-media file date can be any data or content embedded and/or associated with a multi-media file. Some examples of multi-media data comprise, but are not limited to visual content (e.g., images, frames, objects or characters in the images, frames or videos, movement of objects or characters, lighting of video frames or photos, and/or any other forms of video content known in the art), textual content, audio content, drift points, metadata, and/or any other types or forms of multi-media data known and understood in the art.

Figure 1B:
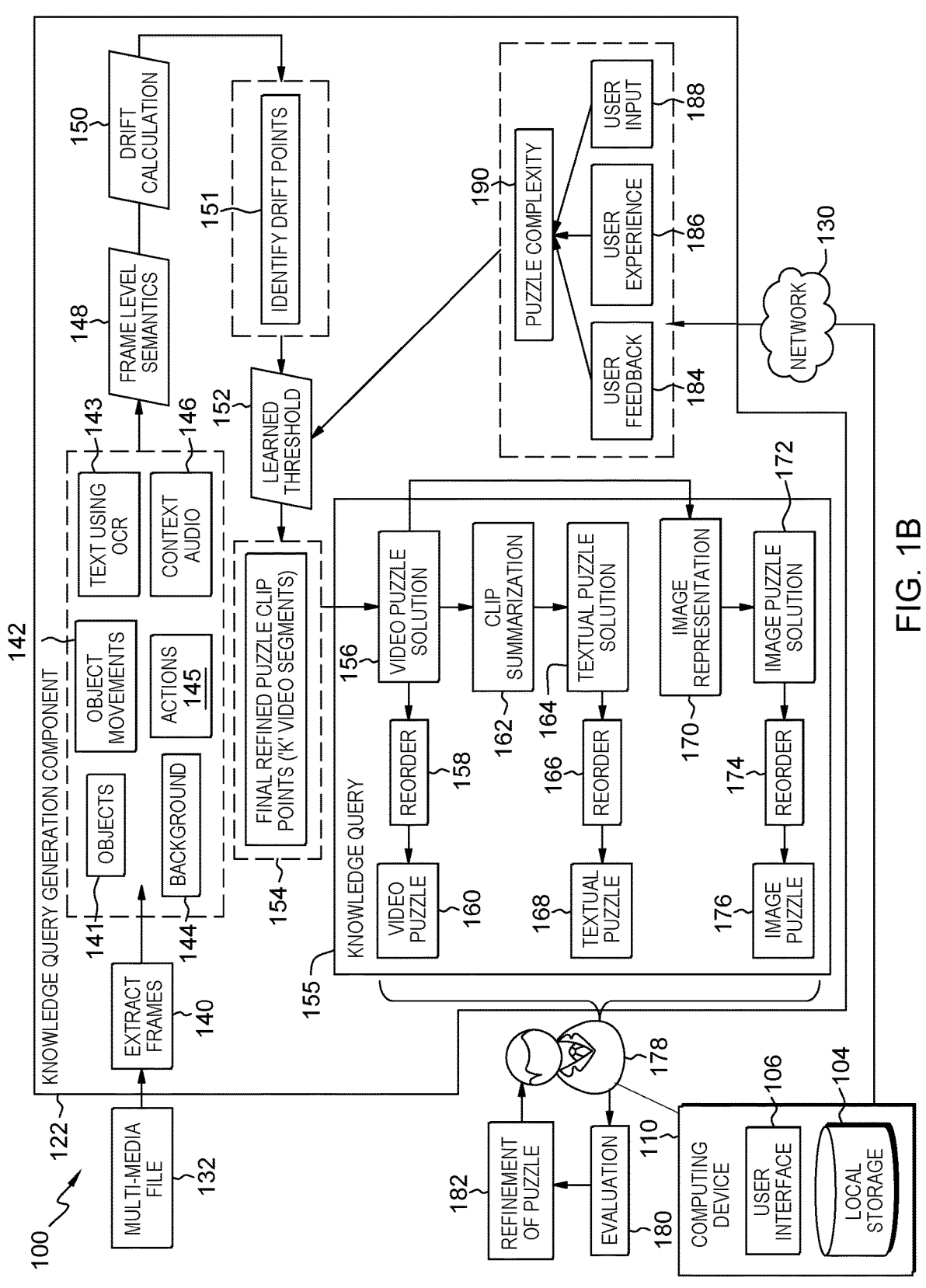
FIG. 1B is a functional block diagram illustrating a distributed data processing environment of a knowledge query generation component, in accordance with an embodiment of the present invention.

FIG. 1B is a functional block diagram illustrating a distributed data processing environment, generally designated 100, detailing component 122, in accordance with one embodiment of the present invention. The term "distributed" as used in this specification describes a computer system that includes multiple, physically distinct devices that operate together as a single computer system. FIG. 1B provides only an illustration of one implementation and does not imply any limitations with regard to the environments in which different embodiments may be implemented. Many modifications to the depicted environment may be made by those skilled in the art without departing from the scope of the invention as recited by the claims. In the depicted embodiment, component 122 is executing on computer server 122; however, in other embodiments, not depicted in FIG. 1B, component 122 may operate and/or execute on computing device 110.

In the depicted embodiment, component 122 extracts frames 140 from multi-media file 132, wherein component 122 extracts and aggregates objects 141, object movements 142, text 143, background 144, actions 145, and context audio 146 from multi-media file 132. For example, since a video is a sequence of images, component 122, utilizing a video read library, parses the video into individual frames or a smaller group of frames. Component 122 may extract the text from multi-media file 132, via optical character recognition (OCR). Further, in the depicted embodiment, component 122 executes frame level semantics 148 based on extracted frames 140 from multi-media file 132. Frame level semantics may be the information analyzed and extracted from a given video frame (e.g., not limited to, objects, background, and text). For example, if a video frame for a life science video about insects contains an insect running across a leaf, then component 122 would extract the object, background, and text (any embedded subtitles or text in the background) and the fame level semantics would be an insect running, across a leaf, and the text would be survival instinct or body movement. In the depicted embodiment, component 122 executes drift calculation 150 on extracted frames 140 to identify drift points 151 and determine learned threshold 152. Component 122 may generate learned threshold 152 based on identified drift points 151 calculated by drift calculation 150. In some embodiments, learned threshold 152 is predetermined.

Component 122 may extract and collect multi-media file data from multi-media file 132. In various embodiments, component 122 generates a knowledge query out of one or more multi-media files based on analyzed content with respect to various aspects of the one or more multi-media files (e.g., context from the audio, background, objects, object movement, and key characteristics and/or topics associated with the multi-media file) to validate knowledge objectives and assist in increasing learnability of materials in different levels of extraction, which can reduce the number of times a user revisits a multi-media file (e.g., learning material) and reduce educational and training costs. In various embodiments, component 122 generates knowledge query 155 based on learned threshold 152 and extract frames 140 from multi-media file 132. In the depicted embodiment, component 122 generates knowledge query 155 based on learned threshold 152 associated extract frames 140 from multi-media file 132, wherein knowledge query 155 comprises video-puzzle solution 156, clip summarization 162, textual puzzle solution 164, image representation 170, image puzzle solution 172, video puzzle 160, textual puzzle 168, and image puzzle 176.

Further, in the depicted embodiment, component 122 generates and outputs video puzzle 160, textual puzzle 168 and image puzzle 176 to user 178 based on reorders (reorder 158, reorder 166, and reorder 174) generated knowledge query 155. In the depicted embodiment, component 122 executes and displays final textual puzzle 168 and final image puzzle 176 to user 178, via interface 106, wherein component 122 receives evaluation 180 and puzzle refinement 182 from user 178. Component 122 receives and/or retrieves user feedback 184, user experience 186, and user input 188 from evaluation 180 and puzzle refinement 182, as described in more detail in FIG. 1C. In the depicted embodiment, component 122 adjusts puzzle complexity 190, based on user feedback 184, user experience 186, and user input 188, to dynamically adjust learned threshold 152 and refine puzzle clip points (e.g., video segments) and knowledge query 155.

Figure 1C:
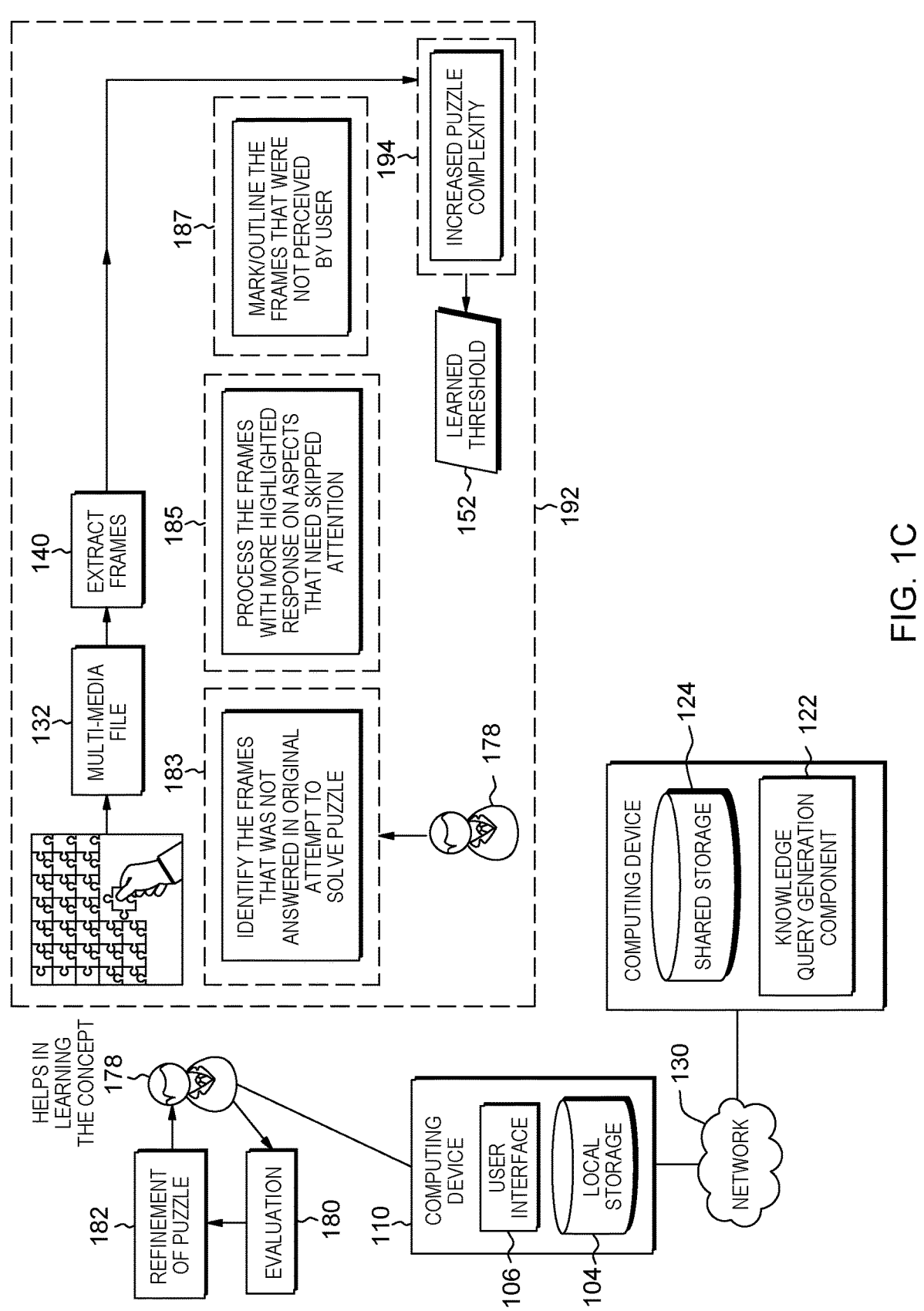
FIG. 1C is a functional block diagram illustrating a distributed data processing environment of the knowledge query generation component, in accordance with an embodiment of the present invention.

FIG. 1C is a functional block diagram illustrating a distributed data processing environment, generally designated 100, detailing knowledge query refinement, in accordance with one embodiment of the present invention. The term "distributed" as used in this specification describes a computer system that includes multiple, physically distinct devices that operate together as a single computer system. FIG. 1C provides only an illustration of one implementation and does not imply any limitations with regard to the environments in which different embodiments may be implemented. Many modifications to the depicted environment may be made by those skilled in the art without departing from the scope of the invention as recited by the claims.

As introduced in FIG. 1B, component 122 comprises a framework for iterative refinement of knowledge query 155 (iterative refinement framework (framework) 192) based previously conducted iteration evaluation. In the depicted embodiment, via component 122 receives evaluation 180 and puzzle refinement 182 from user 178, component 122 receives user feedback data (e.g., user feedback 184, user experience 186, and/or user input 188) from user 178, via interface 106. In the depicted embodiment, component 122 receives answers/responses to generated and output knowledge query 155, wherein component 122 identifies one or more frames that were not answered or answered incorrectly by user 178 (identify frames 183). Component 122 processes 185 extract frames 140 from multi-media file 132, wherein during process 185, component 122 processes the received responses and identifies frames that where not perceived by user 178 because the user did not solve the output knowledge query 155 or answered at least a portion of knowledge query 155 incorrectly.

In the depicted embodiment, component 122 marks/labels and outlines frames 187 of extract frame 140 based on frames associated with knowledge query 155 that were not solved or answered incorrectly by user 178. In the depicted embodiment, based on identified and outlined frames 187, component 122 adjusts puzzle complexity 194, wherein adjusting puzzle complexity 194 comprises increasing and/or decreasing at least a portion of the complexity of the puzzle to ensure the information in multi-media file 132 is efficiently and effectively presented (e.g., taught) to user 178. Further, in the depicted embodiment, component 122 adjusts learned threshold 152 based on adjusted puzzle complexity 194, wherein component 122 generates and outputs updated knowledge queries based on the adjusted learned threshold 152 and adjusted puzzle complexity 194.

In various embodiments, component 122 dynamically adjusts knowledge query 155 based on evaluation 180 and refinement of a puzzle (puzzle refinement 182) (e.g., user feedback 184, user experience 186, and user input 188), wherein dynamic adjusting comprises increasing or decreasing the complexity/difficulty of generated and output knowledge query 155. Component 122 may continuously adjust knowledge query 155 until user has learned the material (i.e., the user reaches a predetermined learning threshold score). A predetermined learning threshold score may be a minimum predetermine score or range of correct answers, with or without time constraint, that a user must achieve to indicate that the user has learned the assigned information (e.g., achieving a minimum score of 85%). In various embodiments, a predetermined learning threshold score may be applied to predetermined standards, wherein predetermined standards are predetermined topics or information the user must learn. For example, assigning a minimum score of 80% in relation to business conduct guideline knowledge query. In some embodiments, component 122 may comprise a plurality of different predetermined learning threshold scores and a plurality of different predetermined standards, wherein each of the plurality of the different predetermined learning threshold scores each apply to/correspond with a different predetermined standard. In various embodiments, component 122 comprises a predetermined minimum complexity of knowledge query generation. Based on at least the information provided above in FIGS. 1A-1C, component 122 improves the art by reducing cost and improving learning efficiency by reducing the amount of required time to generate and mange educational training and learning tools, and by efficiently enabling a user to process and receive the targeted information.

Figure 2:
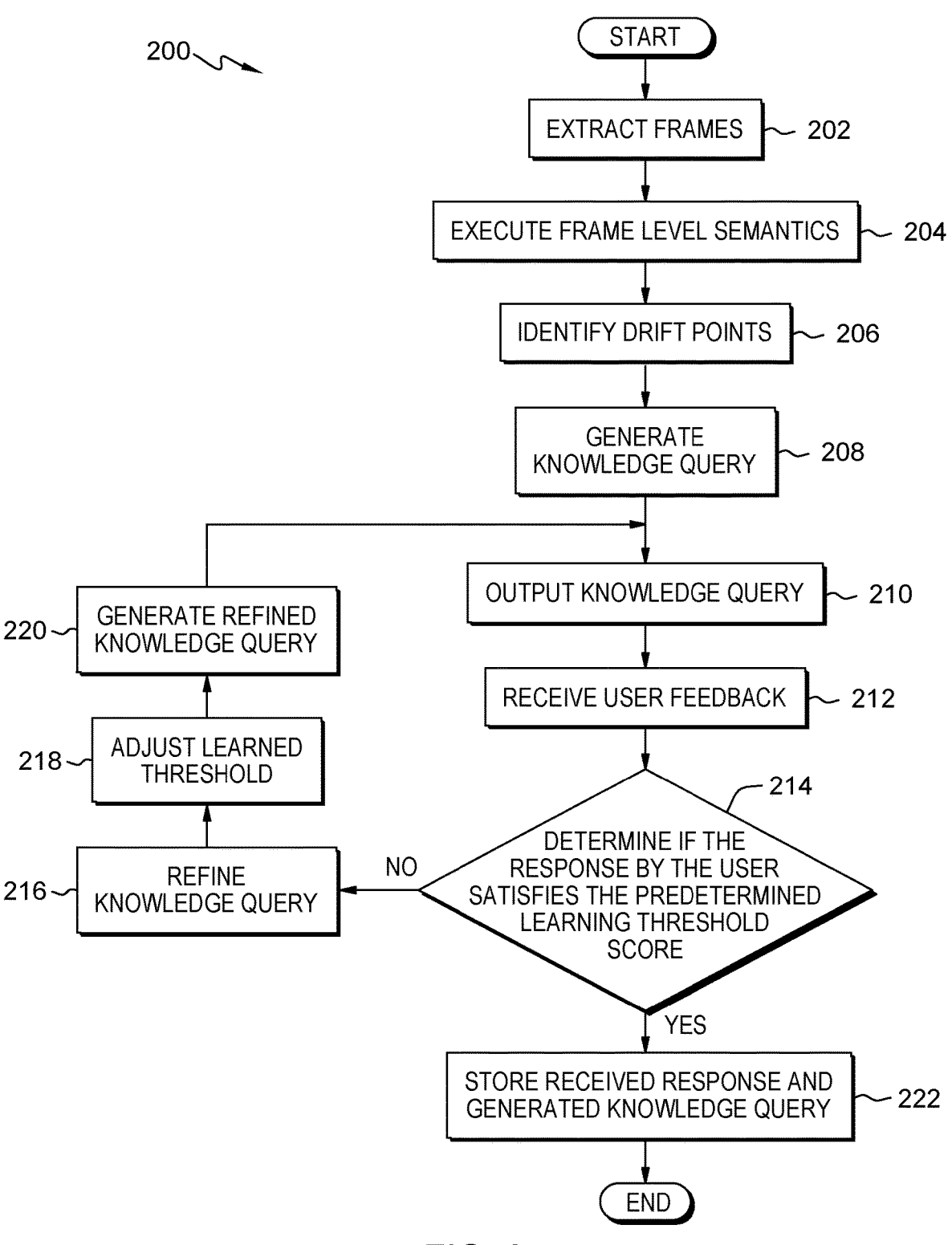
FIG. 2 illustrates operational steps of the program development and management component, on a server computer within the distributed data processing environment of FIGS. 1A-1B, for generating a knowledge content query associated with a media file, in accordance with an embodiment of the present invention.

FIG. 2 illustrates operational steps of component 122, generally designated 200, in communication with server computer 120, within distributed data processing environment 100 of FIG. 1A—FIG. 1C, for generating a knowledge content query associated with a media file, in accordance with an embodiment of the present invention. FIG. 2 provides an illustration of one implementation and does not imply any limitations with regard to the environments in which different embodiments may be implemented. Many modifications to the depicted environment may be made by those skilled in the art without departing from the scope of the invention as recited by the claims.

In step 202, component 122 extracts frames from a multi-media file. In various embodiments, component 122 extracts one or more frames and/or files from one or more multi-media files.

In step 204, component 122 executes frame level semantics on the extracted frames. In various embodiments, component 122 executes frame level semantics on the one or more extracted frames.

In step 206, component 122 identifies drift points in the multi-media file based on extracted frames. In various embodiments, component 122 identifies drift points based on frame level semantics of the extracted frames. Component 122 may identify one or more drift points based on drift calculations comprising frame level semantics of the extracted frames.

In step 208, component 122 generates a knowledge query associated with a multi-media file. In various embodiments, component 122 generates one or more knowledge query associated with one or more multi-media files. In various embodiments, component 122 generates one or more types of knowledge queries based on identified drift points, predetermined thresholds, and/or predetermined learning objectives associated with a multi-media file.

In step 210, component 122 outputs the generated knowledge query to an end user (e.g., user). In various embodiments, component 122 outputs one or more generated knowledge queries to one or more users, via a user interface (e.g., interface 106). In various embodiments, the generated knowledge query is a responsive prompt that queries the user to answer or solve the generated knowledge query.

In step 212, component 122 receives feedback from a user. In various embodiments, component 122 may receive and/or retrieve responses from a user, via interface 106, wherein component 122 evaluates the received and/or retrieved user response against previously generated and scored knowledge queries, predetermined thresholds, and/or predetermined learning objectives associated with a multimedia file.

In step 214, component 122 determines if the response of the user satisfy the predetermined leaning threshold score. In various embodiments, component 122 determines whether the received and/or retrieved response(s) of the user associated with the generated and output knowledge query satisfy the predetermined learning threshold score, wherein satisfying the predetermined learning threshold score is accomplished when the score of the response(s) of the user meets or exceeds a minimum evaluation score. For example, answering at least 70% of the questions in the knowledge query correct or solving at least 75% of the puzzle within two minutes. In the depicted embodiment, if component 122 determines the response of the user does satisfy the predetermined learning threshold, (Yes step), then component 122 advances to step 222. However, in the depicted embodiment, if component 122 determines the response of the user does not satisfy the predetermined learning threshold, (No step), then component 122 advances to step 216.

In step 216, component 122 refines the generated knowledge query. In various embodiments, component 122 refines the generated knowledge query based on received user responses and user feedback. In various embodiments, component 122 may output a predetermined evaluation questionnaire to the user, via interface 106, upon the submission of the output knowledge query to collect user feedback, user experience, and/or user input. In other embodiments, component 122 concurrently evaluates the output knowledge query while the user actively answers the generated prompts, questions, and/or puzzles present in the knowledge query.

In step 218, component 122 adjusts the learned threshold. In various embodiments, component 122 dynamically adjusts the learned threshold and puzzle complexity by refining knowledge query clip points based on the received user feedback, user experience, and/or user input.

In step 220, component 122 generates a refined knowledge query. In various embodiments, component 122 generates one or more generated refined knowledge queries, wherein the generated one or more refined knowledge queries are based on the adjusted learned threshold and are either increased or decreased in complexity in comparison to the previously or initially generated knowledge query.

In step 222, component 122 stores received responses and generated knowledge queries. In various embodiments, component 122 stores received responses and generated knowledge queries to local storage 104 and/or shared storage 124. In various embodiments, responsive to determining the received responses to the questions and/or puzzles in the generated knowledge query by the user satisfy the learning threshold score, component 122 stores received responses and any generated knowledge queries (e.g., initial and refined knowledge queries) to local storage 104 and/or shared storage 124.

Figure 3:
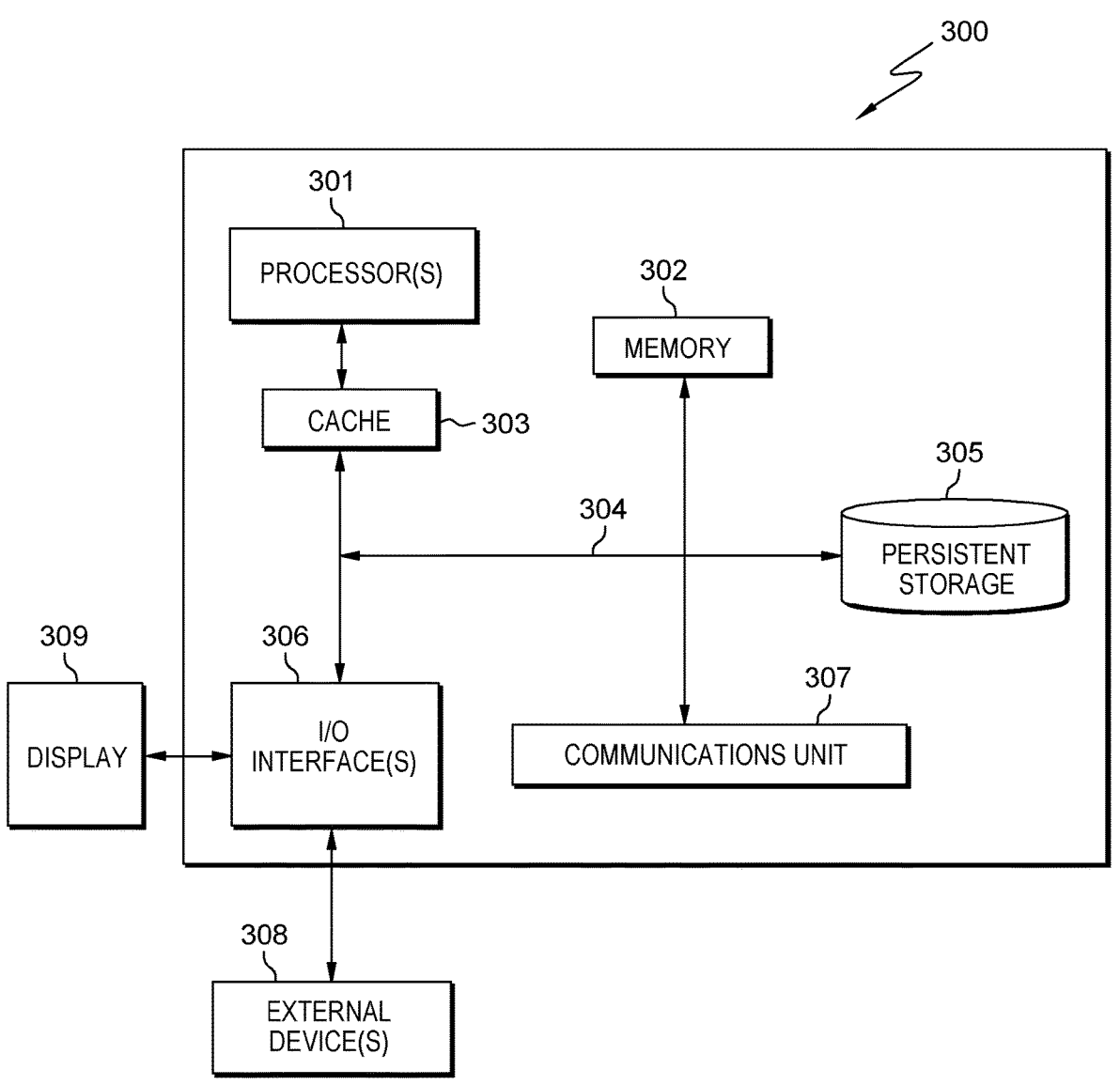
FIG. 3 depicts a block diagram of components of the server computer executing the program development and management component within the distributed data processing environment of FIGS. 1A-1C, in accordance with an embodiment of the present invention.

FIG. 3 depicts a block diagram of components of server computer 120 within distributed data processing environment 100 of FIG. 1A-1C, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

FIG. 3 depicts computer system 300, where server computer 120 represents an example of computer system 300 that includes component 122. The computer system includes processors 301, cache 303, memory 302, persistent storage 305, communications unit 307, input/output (I/O) interface(s) 306, display 309, external device(s) 308 and communications fabric 304. Communications fabric 304 provides communications between cache 303, memory 302, persistent storage 305, communications unit 307, and input/output (I/O) interface(s) 306. Communications fabric 304 may be implemented with any architecture designed for passing data and/or control information between processors (such as microprocessors, communications, and network processors, etc.), system memory, peripheral devices, and any other hardware components within a system. For example, communications fabric 304 may be implemented with one or more buses or a crossbar switch.

Memory 302 and persistent storage 305 are computer readable storage media. In this embodiment, memory 302 includes random access memory (RAM). In general, memory 302 may include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 enables for input and output of data with other devices that may be connected to each computer system. For example, I/O interface 306 may provide a connection to external devices 308 such as a keyboard, keypad, a touch screen, and/or some other suitable input device. External devices 308 may also include portable computer readable storage media such as, for example, thumb drives, portable optical or magnetic disks, and memory cards. Software and data used to practice embodiments of the present invention may be stored on such portable computer readable storage media and may be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for generating a knowledge content query associated with a multi-media file, the computer-implemented method comprising:

identifying, by a computing device, one or more drift points based on implicit user feedback-based assessment and a user experience to generate one or more knowledge content queries of different complexity from the multi-media file by detecting changes in objects, background, text, audio context, or object movement between extracted frames of the multi-media file to identify drift points;

determining a learned threshold for the one or more drift points based on drift-calculation metrics derived from the frame-level semantics;

adjusting a threshold for the one or more drift points to generate different variations of the one or more knowledge content queries;

performing iterative refinement on the one or more knowledge queries based on one or more previous iteration evaluations, wherein performing iterative refinement comprises:

regenerating updated knowledge content queries until a predetermined learning threshold score is satisfied;

generating the one or more knowledge content queries in different modalities based on the multi-media file and the threshold for the one or more drift points;

generating and outputting the one or more knowledge queries to a user based on the one or more knowledge content queries, wherein the one or more knowledge queries comprise: a video puzzle, textual puzzle, and image puzzle; and executing and displaying a final textual puzzle and a final image puzzle to the user through a computer-based user interface, wherein evaluation and puzzle refinement from the user is received through the computer-based user interface.

2. The computer-implemented method of claim 1, further comprising:

extracting one or more frames from the multi-media file;

executing frame level semantics on the one or more extracted frames.

3. The computer-implemented method of claim 1, further comprising:

outputting the one or more knowledge content queries to a user, wherein the one or more knowledge content queries are a responsive prompt that query the user to answer or solve a prompt in the one or more generated knowledge queries.

4. The computer-implemented method of claim 1, further comprising:

evaluating one or more received responses from a user against one or more previously generated and scored knowledge content queries, predetermined thresholds, or predetermined learning objectives associated with the multi-media file.

5. The computer-implemented method of claim 1, further comprising:

determining a received response from a user, associated with the one or more knowledge content queries, does not satisfy a predetermined learning threshold score.

6. The computer-implemented method of claim 1, further comprising:

responsive to determining a received responses to the one or more knowledge content queries satisfies a learning threshold score, storing the received responses and the one or more knowledge content queries.

7. The computer-implemented method of claim 1, wherein adjusting the threshold further comprises:

dynamically adjusting a learning threshold and a complexity of the one or more generated knowledge content queries by refining one or more of the points based on a received user feedback, the user experience, or a user input.

8. A computer system for generating a knowledge content query associated with a multi-media file, the computer system comprising:

one or more computer processors;

one or more computer readable storage devices; and program instructions stored on the one or more computer readable storage devices for execution by at least one of the one or more computer processors, the stored program instructions comprising:

program instructions to identify, by a computing device, one or more drift points based on implicit user feedback-based assessment and a user experience to generate one or more knowledge content queries of different complexity from the multi-media file by detecting changes in objects, background, text, audio context, or object movement between extracted frames of the multi-media file to identify drift points;

program instructions to determine a learned threshold for the one or more drift points based on drift-calculation metrics derived from the frame-level semantics;

program instructions to adjust a threshold for the one or more drift points to generate different variations of the one or more knowledge content queries;

program instructions to perform iterative refinement on the one or more knowledge queries based on one or more previous iteration evaluations, wherein performing iterative refinement comprises:

regenerating updated knowledge content queries until a predetermined learning threshold score is satisfied;

program instructions to generate the one or more knowledge content queries in different modalities based on the multi-media file and the threshold for the one or more drift points;

program instructions to generate and output the one or more knowledge queries to a user based on the one or more knowledge content queries, wherein the one or more knowledge queries comprise: a video puzzle, textual puzzle, and image puzzle; and program instructions to execute and display a final textual puzzle and a final image puzzle to the user through a computer-based user interface, wherein evaluation and puzzle refinement from the user is received through the computer-based user interface.

9. The computer system of claim 8, further comprising:

program instructions to extract one or more frames from the multi-media file;

executing frame level semantics on the one or more extracted frames.

10. The computer system of claim 8, further comprising:

program instructions to output the one or more knowledge content queries to a user, wherein the one or more knowledge content queries are a responsive prompt that query the user to answer or solve a prompt in the one or more generated knowledge queries.

11. The computer system of claim 8, further comprising:

program instructions to evaluate one or more received responses from a user against one or more previously generated and scored knowledge content queries, predetermined thresholds, or predetermined learning objectives associated with the multi-media file.

12. The computer system of claim 8, further comprising:

program instructions to determine a received response from a user, associated with the one or more knowledge content queries, does not satisfy a predetermined learning threshold score.

13. The computer system of claim 8, further comprising:

responsive to determining a received responses to the one or more knowledge content queries satisfies a learning threshold score, program instructions to store the received responses and the one or more knowledge content queries.

14. The computer system of claim 8, wherein adjusting the threshold further comprises:

program instructions to dynamically adjust a learning threshold and a complexity of the one or more generated knowledge content queries by refining one or more of the points based on a received user feedback, the user experience, or a user input.

15. A computer program product for generating a knowledge content query associated with a multi-media file, the computer program product comprising:

one or more computer readable storage devices and program instructions stored on the one or more computer readable storage devices, the stored program instructions comprising:

program instructions to identify, by a computing device, one or more drift points based on implicit user feedback-based assessment and a user experience to generate one or more knowledge content queries of different complexity from the multi-media file by detecting changes in objects, background, text, audio context, or object movement between extracted frames of the multi-media file to identify drift points;

program instructions to determine a learned threshold for the one or more drift points based on drift-calculation metrics derived from the frame-level semantics;

program instructions to adjust a threshold for the one or more drift points to generate different variations of the one or more knowledge content queries;

program instructions to perform iterative refinement on the one or more knowledge queries based on one or more previous iteration evaluations, wherein performing iterative refinement comprises:

regenerating updated knowledge content queries until a predetermined learning threshold score is satisfied;

program instructions to generate the one or more knowledge content queries in different modalities based on the multi-media file and the threshold for the one or more drift points;

program instructions to generate and output the one or more knowledge queries to a user based on the one or more knowledge content queries, wherein the one or more knowledge queries comprise: a video puzzle, textual puzzle, and image puzzle; and program instructions to execute and display a final textual puzzle and a final image puzzle to the user through a computer-based user interface, wherein evaluation and puzzle refinement from the user is received through the computer-based user interface.

16. The computer program product of claim 15, further comprising:

program instructions to extract one or more frames from the multi-media file;

executing frame level semantics on the one or more extracted frames.

17. The computer program product of claim 15, further comprising:

program instructions to output the one or more knowledge content queries to a user, wherein the one or more knowledge content queries are a responsive prompt that query the user to answer or solve a prompt in the one or more generated knowledge queries.

18. The computer program product of claim 15, further comprising:

program instructions to evaluate one or more received responses from a user against one or more previously generated and scored knowledge content queries, predetermined thresholds, or predetermined learning objectives associated with the multi-media file.

19. The computer program product of claim 15, further comprising:

program instructions to determine a received response from a user, associated with the one or more knowledge content queries, does not satisfy a predetermined learning threshold score.

20. The computer program product of claim 15, wherein adjusting the threshold further comprises:

program instructions to dynamically adjust a learning threshold and a complexity of the one or more generated knowledge content queries by refining one or more of the points based on a received user feedback, the user experience, or a user input.

* * * * *